US012659267B2

(12) United States Patent
Xu et al.

(10) Patent No.: US 12,659,267 B2
(45) Date of Patent: Jun. 16, 2026

(54) DYNAMIC ROUTE SELECTION IN INTEGRATED ACCESS AND BACKHAUL SYSTEM

(71) Applicant: Nokia Technologies Oy, Espoo (FI)

(72) Inventors: Xiang Xu, Nanjing (CN); Colin Kahn, Morris Plains, NJ (US); Dawid Koziol, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 647 days.

(21) Appl. No.: 17/058,434

(22) PCT Filed: Jun. 26, 2018

(86) PCT No.: PCT/CN2018/092927
§ 371 (c)(1),
(2) Date: Nov. 24, 2020

(87) PCT Pub. No.: WO2020/000203
PCT Pub. Date: Jan. 2, 2020

(65) Prior Publication Data
US 2021/0258244 A1 Aug. 19, 2021

(51) Int. Cl.
*H04L 45/28* (2022.01)
(52) U.S. Cl.
CPC ................................... *H04L 45/28* (2013.01)
(58) Field of Classification Search
CPC ............................... H04L 45/28; H04W 40/22
See application file for complete search history.

(56) References Cited

U.S. PATENT DOCUMENTS

| | | | |
|---|---|---|---|
| 10,015,089 B1 * | 7/2018 | Gonzalez | H04L 12/4641 |
| 2009/0055267 A1 * | 2/2009 | Roker | G06Q 30/02 |
| | | | 705/14.1 |
| 2011/0069673 A1 * | 3/2011 | Oswal | H04W 8/082 |
| | | | 370/331 |
| 2015/0124613 A1 * | 5/2015 | Yu | H04L 47/125 |
| | | | 370/235 |

(Continued)

FOREIGN PATENT DOCUMENTS

| | | |
|---|---|---|
| CN | 107852363 A | 3/2018 |
| CN | 107873126 A | 4/2018 |
| WO | 2016/168603 A1 | 10/2016 |

OTHER PUBLICATIONS

Office Action received for corresponding Indonesian Patent Application No. P00202008119, dated Sep. 18, 2022, 3 pages of Office Action and 3 pages of translation available.

(Continued)

*Primary Examiner* — Syed Ali

(74) *Attorney, Agent, or Firm* — McCarter & English, LLP

(57) ABSTRACT

A method including receiving, by at least one integrated access and backhaul node and donor distributed unit, routing information and preference information to reach at least one mobile terminal and the at least one donor in an integrated access and backhaul node topology. The method further includes transmitting at least one link event notification, and receiving at least one link event notification. The method also includes adapting at least one of an uplink route and a downlink route based on the preference information and the at least one link event notification.

19 Claims, 7 Drawing Sheets

(56) References Cited

U.S. PATENT DOCUMENTS

| | | | | |
|---|---|---|---|---|
| 2015/0156815 | A1* | 6/2015 | Pang | H04W 84/12 |
| | | | | 370/338 |
| 2016/0007273 | A1* | 1/2016 | Farid | H04W 48/16 |
| | | | | 370/329 |
| 2017/0118795 | A1* | 4/2017 | Guo | H04W 72/21 |
| 2018/0091416 | A1* | 3/2018 | Ghosh | H04L 45/123 |
| 2018/0092139 | A1 | 3/2018 | Novlan et al. | |
| 2019/0223002 | A1* | 7/2019 | Novlan | H04W 72/20 |
| 2019/0289492 | A1* | 9/2019 | Hampel | H04W 28/24 |
| 2019/0313269 | A1* | 10/2019 | Keskitalo | H04B 7/15542 |
| 2020/0029384 | A1* | 1/2020 | Hong | H04W 36/305 |
| 2020/0045610 | A1* | 2/2020 | Shih | H04L 45/28 |
| 2021/0274381 | A1* | 9/2021 | Teyeb | H04L 1/1854 |
| 2021/0377784 | A1* | 12/2021 | Marco | H04W 40/22 |
| 2022/0150795 | A1* | 5/2022 | Zee | H04W 36/08 |
| 2023/0147845 | A1* | 5/2023 | Teyeb | H04W 76/19 |
| | | | | 370/328 |

OTHER PUBLICATIONS

Office Action received for corresponding Chinese Patent Application No. 201880095106.0, dated Oct. 8, 2022, 6 pages of Office Action and no page of translation available.

Extended European Search Report received for corresponding European Patent Application No. 18924811.5, dated Jan. 21, 2022, 10 pages.

"Lossless Data Transfer for IAB Design with Hop-by-Hop RLC ARQ", 3GPP TSG-RAN WG2 AH-1807, R2-1810382, Agenda : 11.1.2, AT&T, Jul. 2-6, 2018, 5 pages.

"3rd Generation Partnership Project; Technical Specification Group Radio Access Network; Study on Integrated Access and Backhaul; (Release 15)", 3GPP TR 38.874, V0.2.1, May 2018, pp. 1-19.

"3rd Generation Partnership Project; Technical Specification Group Radio Access Network; Study on channel model for frequency spectrum above 6 GHZ (Release 14)", 3GPP TR 38.900, V14.3.1, Jul. 2017, pp. 1-85.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.1.0, Mar. 2018, pp. 1-52.

"3rd Generation Partnership Project; Technical Specification Group Radio Access Network; NG-RAN; NR user plane protocol(Release 15)", 3GPP TS 38.425, V15.1.0, Mar. 2018, pp. 1-19.

"Part 16: Air Interface for Broadband Wireless Access Systems, Amendment 1: Multihop Relay Specification", IEEE Std 802.16j™, IEEE Standard for Local and metropolitan area networks, 2009, 314 pages.

"3rd Generation Partnership Project; Technical Specification Group Radio Access Network; NG-RAN; F1 application protocol (F1AP) (Release 16)", 3GPP TS 38.473, V16.3.1, Oct. 2020, pp. 1-455.

"3rd Generation Partnership Project; Technical Specification Group Services and System Aspects; System Architecture for the 5G System; Stage 2 (Release 15)", 3GPP TS 23.501, V15.2.0, Jun. 2018, pp. 1-217.

International Search Report and Written Opinion received for PCT/CN2018/092927, dated Mar. 18, 2019, 10 pages.

"Adaptation Layer and Routing for IAB in NR", 3GPP TSG RAN WG3 Meeting #100, R3-183169, Agenda : 24.1.2, Intel Corporation, May 21-25, 2018, pp. 1-6.

"IAB Topology management and route management", Intel Corporation, 3GPP TSG-RAN WG2 NR AdHoc #1807, R2-1809765, Jul. 2018, 5 pages.

* cited by examiner

200

500

510: configure a Donor DU and intermediate IAB nodes with routing information

520: configure the Donor DU and intermediate IAB nodes with preferences

530: send routes and preferences to branching nodes

600

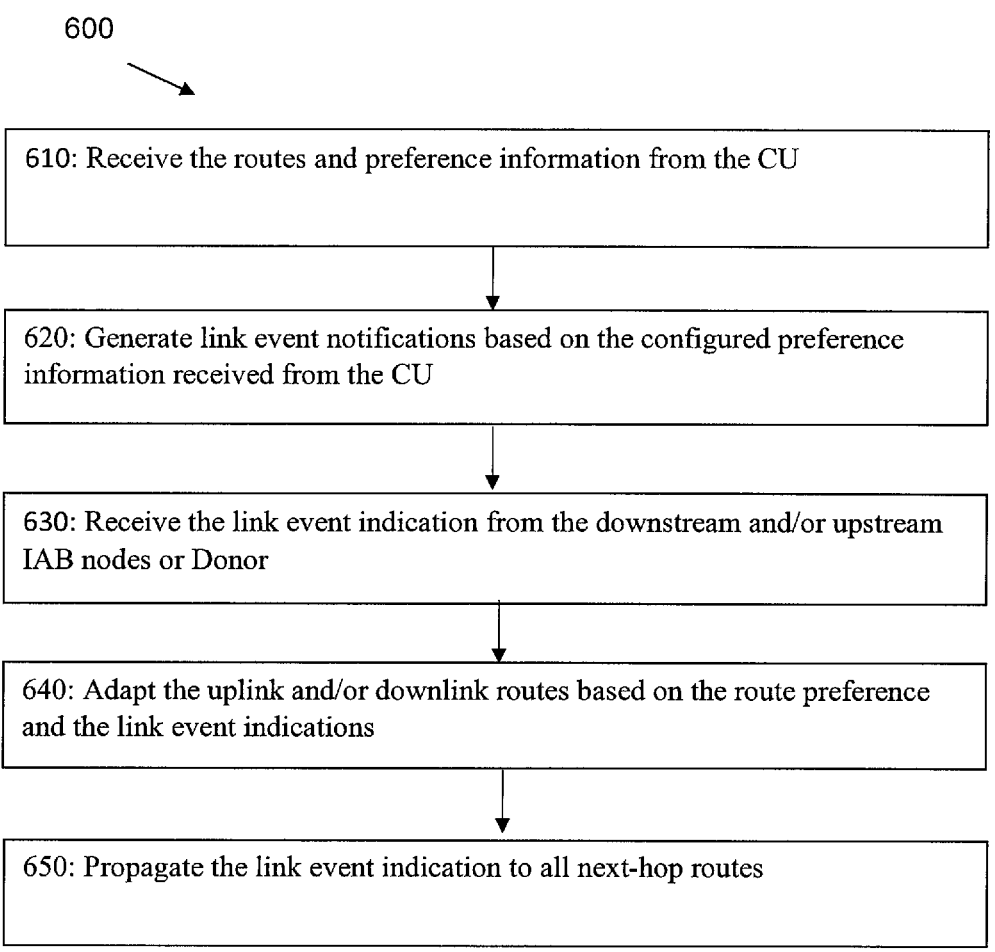

610: Receive the routes and preference information from the CU

620: Generate link event notifications based on the configured preference information received from the CU 630: Receive the link event indication from the downstream and/or upstream IAB nodes or Donor 640: Adapt the uplink and/or downlink routes based on the route preference and the link event indications 650: Propagate the link event indication to all next-hop routes

Fig. 6

DYNAMIC ROUTE SELECTION IN INTEGRATED ACCESS AND BACKHAUL SYSTEM

RELATED APPLICATION

This application was originally filed as PCT Application No. PCT/CN2018/092927 on Jun. 26, 2018, each of which is incorporated herein by reference in its entirety.

TECHNICAL FIELD

The teachings in accordance with the exemplary embodiments of this invention relate generally to integrated access and backhaul networks. More specifically, teachings in accordance with the exemplary embodiments relate to routing in an integrated access and backhaul system.

BACKGROUND

3GPP determines standards and specifications for NR Integrated Access and Backhaul (for example, via TR38.874). Various layer 2 ("L2") and layer 3 ("L3") based solutions have been proposed in RAN2/RAN3 meetings. In the "L2"-based solutions, the IAB node contains a DU and packets are forwarded by the radio layers (below PDCP). In the L3 based solutions, the IAB node contains a DU and/or a gNB, and packets are forwarded at layers above PDCP. In both cases IAB nodes perform hop-by-hop routing to maintain connectivity between the MT serving IAB node and the Donor. The MT or the IAB may have multi-connectivity to multiple IABs or donors, so more than one path may be present at a given time.

Multi-hop backhauling provides greater range extension than single hop backhauling. This is especially beneficial for backhaul at frequencies above-6 GHz due to limited range. Multi-hop backhauling further enables backhauling around obstacles, for example, buildings and other clutter in urban environments where line-of-sight between nodes is obstructed.

Certain abbreviations that may be found in the description and/or in the Figures are herewith defined as follows:

| | |
|---|---|
| AMF | Access and Mobility Management Function |
| ARQ | Automatic Repeat Request |
| AUSF | Authentication Server Function |
| CU | Central Unit (of RAN) |
| DC | Dual Connectivity |
| DU | Distributed Unit |
| F1AP | Front haul (F1) Application Protocol |
| gNB | 5G Enhanced Node B (Base station) |
| GTP | GPRS Tunnelling Protocol |
| HARQ | Hybrid Automatic Repeat Request |
| IAB: | Integrated Access and Backhaul |
| IAB MT (IAB node UE): | MT function in an IAB node |
| IAB DU (IAB node DU): | gNB DU function in a IAB node |
| LTE | long term evolution |
| MEC | multi-access edge computing |
| MCG | master cell group |
| MME | mobility management entity |
| MT | Mobile Termination |
| NCE | network control element |
| NF | Network Function |
| NG-AP | Next generation application protocol |
| NGC | Next generation core |
| NR | New radio |
| N/W | Network |
| PCI | Physical Cell ID |
| PDCP | Packet Data Convergence Protocol |

-continued

| | |
|---|---|
| PDU | Protocol Data Unit |
| RAN | Radio Access Network |
| RLC | Radio Link Control |
| RRC | Radio Resource Control |
| RRM | Radio Resource Management |
| SCG | Secondary cell group |
| SMF | Session Management Function |
| SN | Secondary Node |
| TM | Topology Management |
| TRP | Total radiated power |
| UDM | User Data Management |
| UDP | User Datagram Protocol |
| UE | User Equipment |
| UPF | User Plane Function |
| 5G | Fifth generation mobile communication system |

BRIEF SUMMARY

The following summary includes examples and is merely intended to be exemplary. The summary is not intended to limit the scope of the claims.

In accordance with one aspect, an example method comprises receiving, by at least one integrated access and backhaul node and donor distributed unit, routing information and preference information to reach at least one mobile terminal and the at least one donor in an integrated access and backhaul node topology. The method further includes transmitting at least one link event notification, and receiving at least one link event notification. The method also includes adapting at least one of an uplink route and a downlink route based on the preference information and the at least one link event notification.

In accordance with another aspect, an example method comprises receiving, by at least one integrated access and backhaul node and donor distributed unit, routing information and preference information to reach at least one mobile terminal and the at least one donor in an integrated access and backhaul node topology, transmitting at least one link event notification, receiving at least one link event notification, and adapting at least one of an uplink route and a downlink route based on the preference information and the at least one link event notification.

In accordance with another aspect, an example apparatus comprises means for configuring, by at least one donor central unit, at least one of at least one donor distributed unit and at least one integrated access and backhaul node with routing information to reach at least one mobile terminal and the at least one donor, means for configuring the at least one of at least one donor distributed unit and the at least one intermediate integrated access and backhaul node with preference information; and means for sending the routing information and the preference information to at least one branching node and the at least one integrated access and backhaul node.

In accordance with another aspect, an example apparatus comprises means for receiving, by at least one branching node, routing information and preference information to reach at least one mobile terminal and the at least one donor in an integrated access and backhaul node topology; means for generating at least one link event notification; means for receiving at least one link event notification; and means for adapting at least one of an uplink route and a downlink route based on the route preference and the at least one link event notification.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 6 shows another method in accordance with example embodiments which may be performed by an apparatus.

DETAILED DESCRIPTION

In the example embodiments as described herein a method and apparatus provides dynamic route selection in an integrated access and backhaul system.

Figure 1:
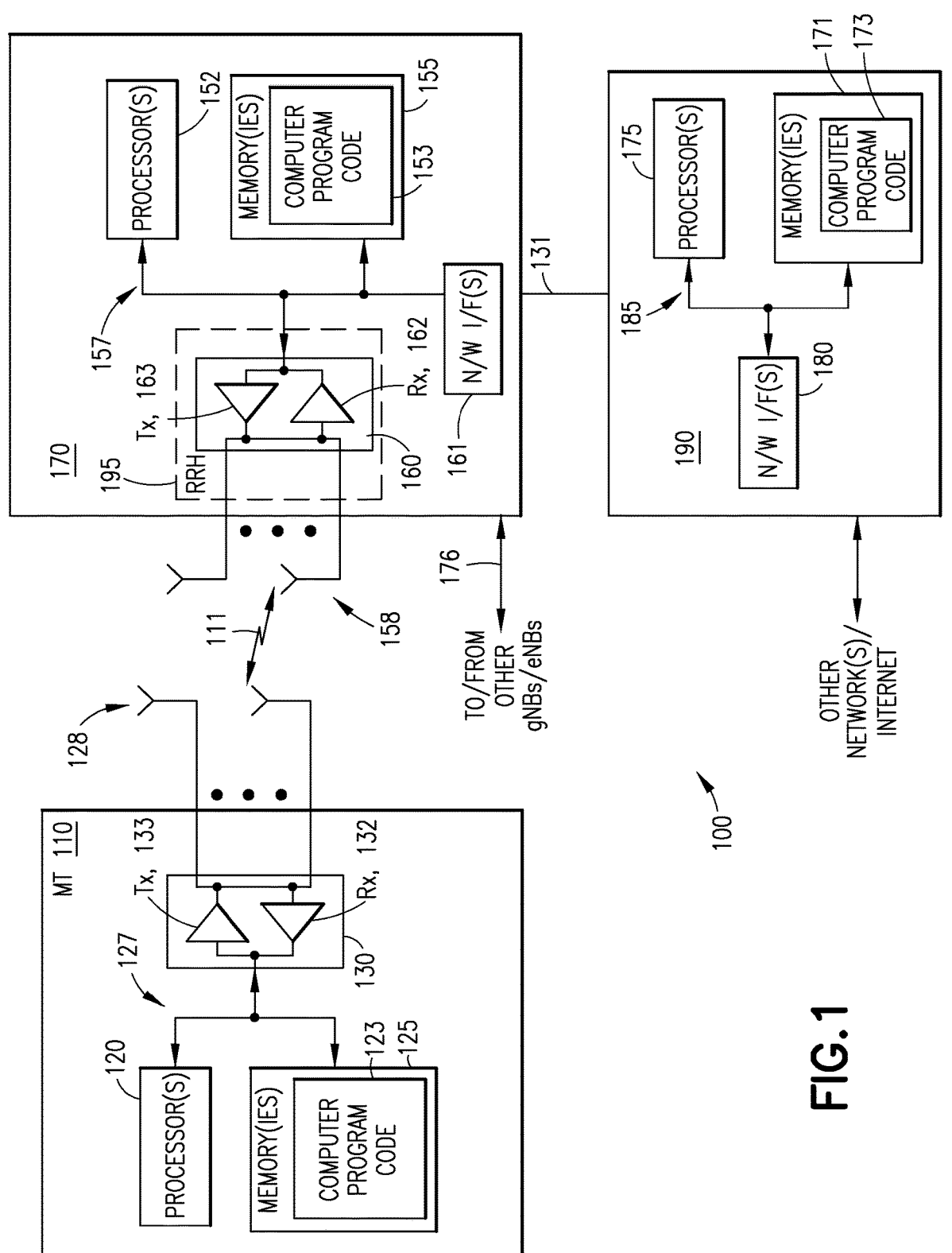
FIG. 1 is a block diagram of one possible and non-limiting example system in which the example embodiments may be practiced.

Turning to FIG. 1, this figure shows a block diagram of one possible and non-limiting example system in which the example embodiments may be practiced. In FIG. 1, the mobile terminal (MT) 110 is in wireless communication with the wireless network 100. The MT is a wireless, typically mobile, device that can access the wireless network. The MT 110 includes one or more processors 120, one or more memories 125, and one or more transceivers 130 interconnected through one or more buses 127. Each of the one or more transceivers 130 includes a receiver (Rx) 132 and a transmitter (Tx) 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The one or more memories 125 and the computer program code 123 may be configured to, with the one or more processors 120, cause the MT 110 to perform one or more of the operations as described herein. The MT 110 communicates with the apparatus 170 via a wireless link 111. 170 may be any one of the IAB donor 220 or the IAB nodes 12 in FIG. 2 for example. In this example the base station 170 has features or components of a gNB. A wireless attached IAB node, a Donor IAB node and a conventional gNB may be implemented on identical hardware or may include different hardware, but some of the core components such as processor(s), memory(ies), receiver(s) and transmitter(s) are present in each. FIG. 1 is merely intended to show a simplified version of some of the components of a IAB node, a Donor IAB node and a conventional gNB, but it is understood that there is a differentiation between a wireless IAB node and a Donor IAB node/gNB.

The gNB 170 is a base station (for example, for 5G/LTE) that provides access by wireless devices such as the MT 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver (Rx) 162 and a transmitter (Tx) 163. The one or more transceivers 160 are connected to one or more antennas 158. The one or more memories 155 include computer program code 153. The one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, for example, link 176. The link 176 may be wired or wireless or both and may implement, for example, an X2 or Xn interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of an gNB. That is, there can be multiple cells per gNB. For instance, there could be three cells for a single gNB carrier frequency and associated bandwidth, each cell covering one-third of a 360 degree area so that the single gNB's coverage area covers an approximate oval or circle. Furthermore, each cell can correspond to a single carrier and an gNB may use multiple carriers. So if there are three 120 degree cells per carrier and two carriers, then the gNB has a total of 6 cells.

The wireless network 100 may include one or more network elements 190. For example, with a EPC the network elements 190 may include MME (Mobility Management Entity) and/or SGW (Serving Gateway) functionality. As another example, with a 5G core network (5GCN) the network elements may include Access and Mobility Management Function (AMF), SMF (Session Management Function) and/or UPF (User Plane Gateway) functionality. Connectivity with a further network may be provided, such as a telephone network and/or a data network (for example, the Internet). The gNB/eNB 170 is coupled via a link 131 to the network element 190. The link 131 may be implemented as, for example, an S1 or NG interface. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

Those skilled in the art will appreciate that the various network element and network element components shown in FIG. 1 may be implemented differently in future wireless networks, and are not limited to 4G, LTE or 5G wireless networks (for instance, MT and gNB/DU are components of the IAB node). For example, the terms PCRF, MME, and SGW are terms generally used for the core elements in a LTE network. In contrast to LTE, future wireless networks may carry out network functions (NFs) by a plurality of cooperating devices. The different NFs, may include for example, Access and Mobility Management Function (AMF), Session Management Function (SMF), Policy Control Function (PCF), Application Function (AF), Authentication Server Function (AUSF), User Plane Function (UPF), and User Data Management (UDM). These NFs may be a virtualized function instantiated on an appropriate platform, such as a cloud infrastructure. For example, certain protocols (such as non real-time protocols for example) may be performed by one or more centralized units (CUs) in a cloud infrastructure, while one or more distributed units (DUs) operate the remaining protocols (e.g. real-time protocols) of the 5G radio interface. In this way, the various NFs may be split between CUs and DUs. Together a CU, underlying DUs, and RRHs may be considered as forming a logical base station (which may be represented by gNB 170 in FIG. 1 for example).

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the MT 110, eNB/gNB 170, and other functions as described herein.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

In certain embodiments, an IAB node, may include a MT part which is similar to MT 110 for communication with the donor node or a parent IAB node's RAN part, in a multi-hop embodiment, and a RAN/DU part which may be similar to a network entity/gNB 170 for communication with access UEs or a next hop IAB node MT part. In certain embodiments, therefore, a single IAB node may include at least two processors, at least two transceivers, at least two memories, and at least two antennas. In other embodiments the processors, transceivers, memories and/or antennas may be shared between the MT part and the RAN part of the IAB node. The nodes may contain some (for example, various different for particular nodes) combination of MT, DU, CU, gNB, and UPF, etc.

Having thus introduced one suitable but non-limiting technical context for the practice of the example embodiments of this invention, the example embodiments will now be described with greater specificity.

Figure 2:
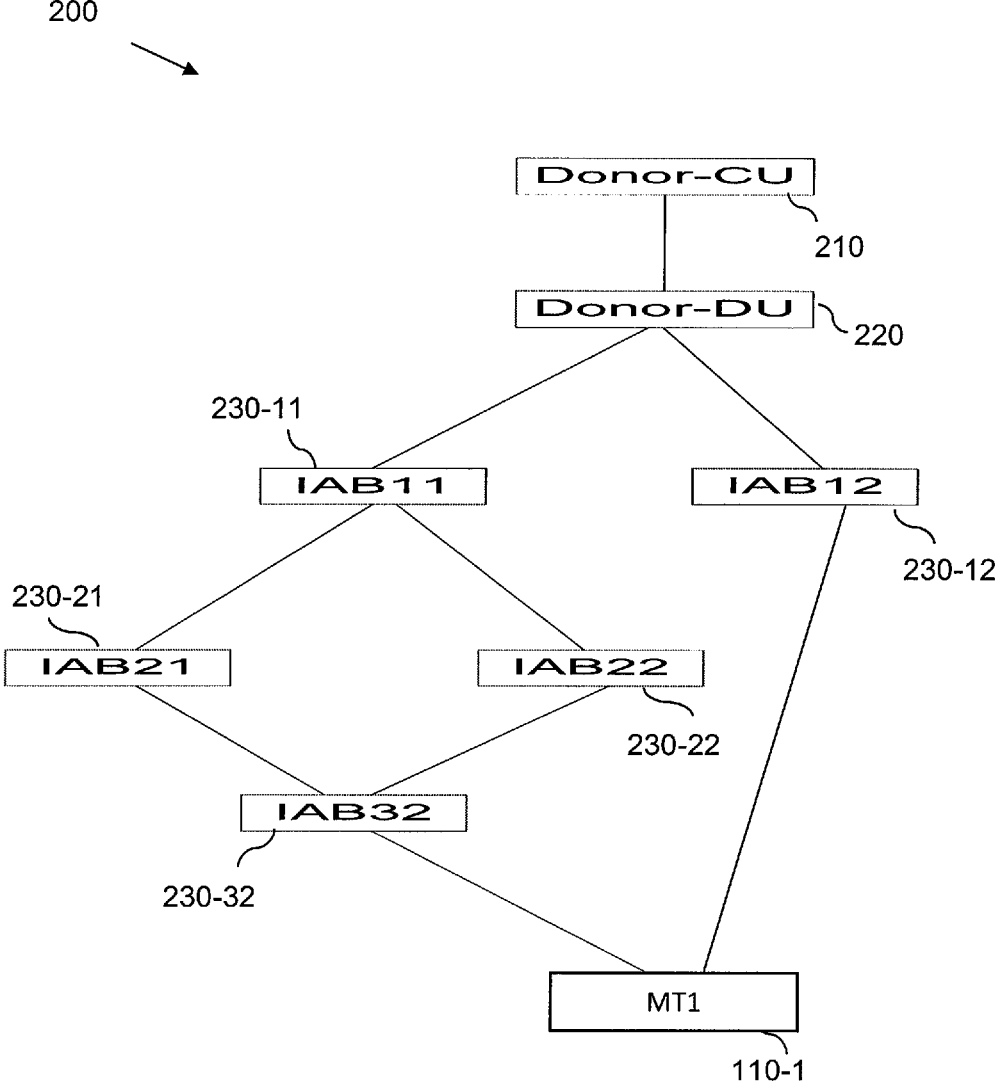
FIG. 2 shows an example illustration of backhauling for multiple-hop.

Referring to FIG. 2, an example illustration of integrated access and backhaul for multiple-hop 200 is shown.

As shown in FIG. 2, a donor central unit (CU) 210 may be connected to a donor distributed unit (DU) 220, which may be connected to a MT 110 (shown as MT1 110-1) via IAB nodes 230 (such as, for example, IAB11, IAB12, IAB21, IAB22, and IAB32).

The donor may be a gNB that terminates wireless backhaul radio interface from one or more IAB nodes. The donor may have other functionalities to support IAB. The donor has wired/fiber connectivity with the network. The donor contains a CU and one or more DU. The CU of the gNB may also support the DU in downstream IAB nodes. A donor may serve directly connected IAB nodes such as IAB11 and IAB12, and IAB nodes that are chained over multiple wireless backhaul hops such as IAB21, IAB22 and IAB32. A donor may also serve directly connected UEs.

A CU is a logical node which may include the functions (for example, gNB functions) such as transfer of user data, mobility control, radio access network sharing, positioning, session management etc., except those functions allocated exclusively to the DU. A CU may control the operation of DUs over a front-haul (Fs) interface. A DU is a logical node which may include a subset of the functions (for example, gNB functions), depending on the functional split option. The operation of the DU may be controlled by the CU.

According to example embodiments, as described with respect to FIG. 2, each IAB node logically contains a mobile terminal (MT) that maintains connectivity with one or more upstream nodes (for example, dual connectivity). Similar to a conventional user equipment (which contains a MT), the IAB node MT may use radio resource control (RRC) signalling to supply radio link measurements of alternative upstream nodes to its current serving gNB CU. Based on signal strength, signal quality and other factors, a handover of an IAB node to a different upstream node may be triggered by RRC. RRC may also add or remove dual/Multi-Connectivity (DC/MC) legs by sending RRC Connection Reconfiguration messages. Hence the IAB topology, such as the one shown in the FIG. 2, may not be static. The IAB topology may change over time as radio conditions fluctuate, and as nodes move, are added or removed. Handover and addition/removal of DC legs may be designed to work on a time scale of seconds to minutes, corresponding to macroscopic movement of MTs through a cellular network.

Figure 3:
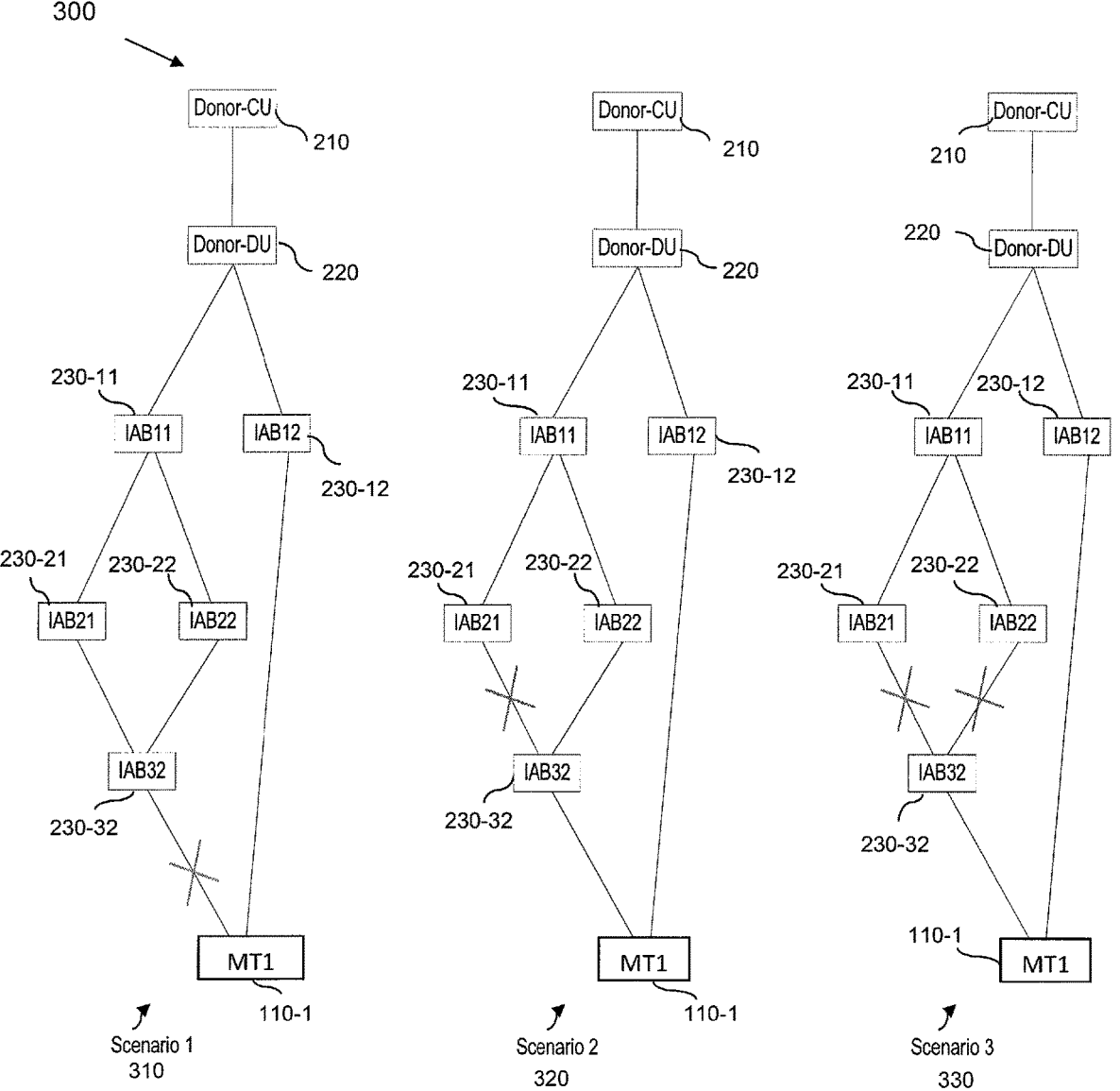
FIG. 3 shows an example illustration of scenarios for packet routing in an IAB node topology.

Referring now to FIG. 3, an example illustration of scenarios for packet routing in an IAB node topology 300 is shown.

According to example embodiments, at mmWave frequencies, the channel accessed (for example, experienced) by a MT 110 may suffer from momentary blockage events that could result in sudden sharp drops in signal strength (for example, of the order of 30 dB) due to physical objects blocking the MT-TRP link as shown (for example, between IAB32 230-32 and MT 110 in scenario 1, 310). Based on blockage model A Urban Macro (UMi) described in the NR channel model TR 38.900, for a 30 km/hr blocker velocity, the mean blockage duration of a single blockage event is 600 microseconds. To improve reliability, multiple routes may be setup for the MT using techniques such as DC/MC as described herein above with respect to FIG. 2. In instances in which a radio link issue arises for a current route, for example, a radio link issue between the MT 110 and the serving JAB 230, or between the IAB 230 and its parent node, the IAB system is required to (for example, quickly) select an alternate route. The example embodiments provide mechanisms that adapt the topology in a sufficient manner to adapt to the blocking in mmWave, which happens over very short time-scales. In contrast, RRC mechanisms that adapt the topology, including handover and changes in dual-connectivity, may be insufficient.

With regard to DC, 3GPP specifies that packet routing to the MCG vs SCG is done at the PDCP layer (see TS37.340). In the L2 architectures, the PDCP layer is in the donor-CU, as indicated in the FIG. 3. Consequently, for a packet to be rerouted the packet must first be sent a second time from the donor-CU to the branching point. For example, in scenario 2 320, due to the link outage between IAB21 230-21 and IAB32 230-32, IAB11 230-11 cannot send the DL packets to IAB21 230-21 without first receiving the packet a second time from the donor-CU 210. This may require the donor CU to resend the DL packets to IAB11 after failure has been detected downstream in instances in which IAB11 230-11 already successfully received them. Only then can IAB11 230-11 send the packet over the alternative path (through IAB22 230-22). In these instances, it is unnecessary to re-send those DL packets to IAB11.

The problems associated with packet routing as described by 3GPP are addressed by the example embodiments. The example embodiments remove (for example, obviate) the requirement for the donor CU to resend the DL packets to IAB11 230-11 after failure has been detected downstream in instances in which IAB11 230-11 already successfully received them.

With regard to the donor-CU 210, in example embodiments, the systems described herein configure the donor DU 220 and IAB nodes 230 with routing information, or topology information from which routing information can be derived for the next node to reach MT 110 and the donor.

The donor-CU 210 may send the routes and preferences to branching nodes (for example, an intermediate IAB node 230, or a Donor-DU 220). The preference information may indicate a preferred route via at least one of route identifier and an identifier of a next hop. Branching nodes may include nodes that provide a branching point when routing communications through multiple different connected nodes (for example, IAB node 230-11 provides a branching point to IAB node 230-21 or 230-22). The information may be sent via C-plane signalling using RRC or F1AP, or U-plane signalling by adding the preference information in an adaptation header, or both. Preference information indicates a preferred route (for example, via route ID or via the identifier of the next hop/next IAB node), and may additionally indicate circumstances when a branching point should switch to the less preferred route/branch or start duplicating packets and send them on both branches. When configuring preferences, donor-CU 210 may take into account the overall knowledge of the IAB topology as well as characteristics of the particular bearer, QoS flow or knowledge of the MTs 110 service or utilized network slice information. For example, for traffic requiring very low delay, donor-CU 210 may set a preferred route to the one having less hops even though that route is more congested at some point in time etc. The CU may also send the preference information to all IAB nodes to ask all IAB nodes to generate link event notification when the IAB node detects the link/route status is changed.

In example embodiments the IAB node and donor DU receive the routes and preference information from the CU (for example, donor-CU 210) via C-plane or U-plane. The IAB node and Donor DU may generate link event notifications based on the configured preference information received from the CU. The preference may indicate when the link event notification should be generated and transmitted to a downstream node, or an upstream node.

The branching node may receive the link event notification (for example, a link event indication) from the downstream and/or upstream IAB nodes 230 or donor. A link event notification may occur under several circumstances, which may be configurable or pre-specified, for example, when the throughput characteristics of a link changes significantly. Alternatively, a link event notification may occur when the number of HARQ retransmissions on a link reaches a certain number. In a further example, a link event notification may occur when the number of RLC ARQ retransmissions reaches a certain number. In a further example, a link event notification may occur when the signal strength is below a threshold, or above a threshold.

The branching node may adapt the uplink and/or downlink routes based on the route preference and the link event notifications. The branching node may also propagate the link event notification to all next-hop routes. The link event notifications may be binary (for example, no route available or link is resumed after declaring no route available). The link event notifications may also have several levels indicating link quality (for example, ranked 1 to 10).

In example embodiments the IAB node 230, or donor-DU 220 may generate link event notifications based on the configured preference information received from the CU, or based on its implementation if CU did not provide the preference information. The link event may be related to the downstream IAB node, or upstream IAB node. Link event notifications may be binary (for example, no route available or link is resumed after declaring no route available). Link event notifications may have several levels indicating link quality (for example, ranked 1 to 10). The IAB node 230, or Donor-DU 220 may propagate the link event notification to next downstream IAB node 230, or upstream node. An intermediate IAB node may consolidate the received link event notification, and include it as part of the link event notification send to next downstream IAB node 230, or upstream node 230.

Figure 4A:
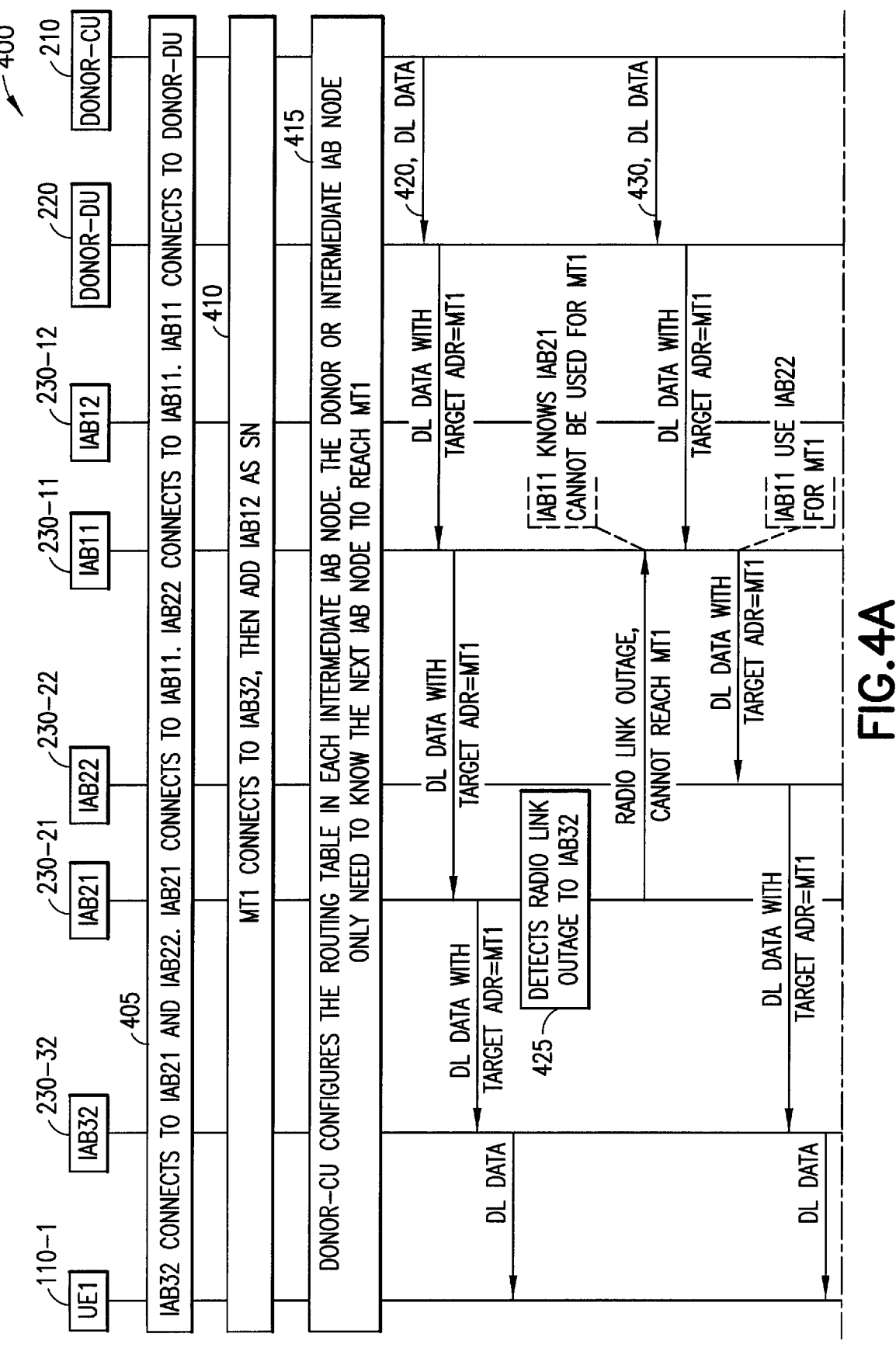
FIG. 4 (which includes FIG. 4A and FIG. 4B) is an example illustration of an enhanced route selection in an integrated access and backhaul system.
Figure 4B:
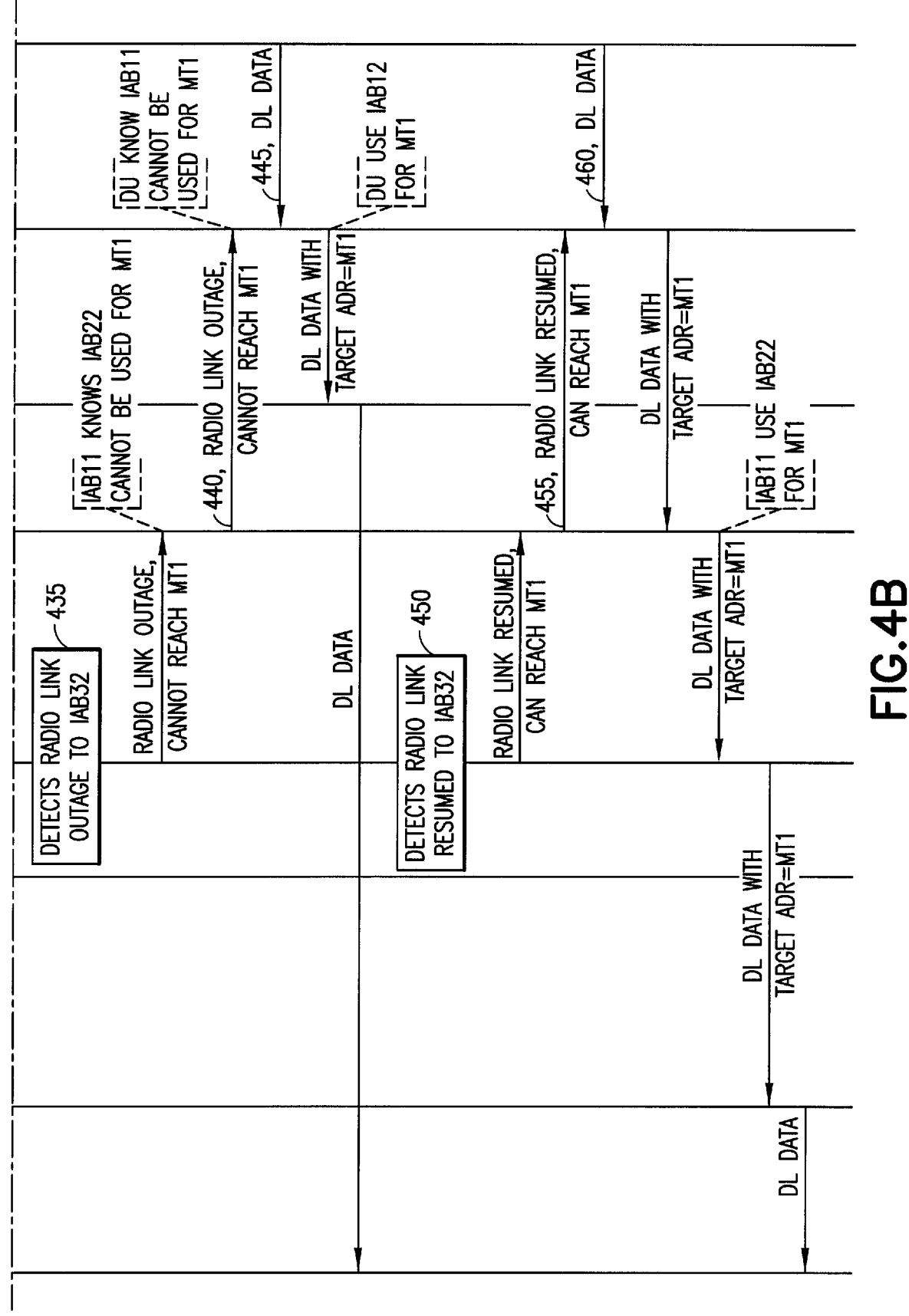

FIG. 4 (which is illustrated by connected FIGS. 4A and 4B) is an example illustration of a call flow for an enhanced route selection in an integrated access and backhaul system 400. FIG. 4 includes signalling between MT1 110-1, donor-DU 220, donor-CU 210 and IABs 230 (IAB11 230-11 to IAB 32 230-32).

At step 405, the IABs 230 may form connections with other IABs 230. For example, IAB32 connects to IAB21 and IAB22. IAB21 and IAB22 connect to IAB11. IAB11 and IAB12 connect to Donor-DU).

At step 410, MT1 110-1 may connect to a primary node and add a secondary node (SN). For example, MT 110-1 connects to IAB32, then add IAB12 as SN).

At step 415, according to an example embodiment, donor-CU 210 configures donor-DU 220, and IAB nodes 230 on how to route the DL traffic to MT1 110-1. The configuration may only require messaging to inform (for example, to tell) the DU (or intermediate IAB node 230) about the next IAB node 230 to reach MT1 110-1.

According to an example embodiment, the configuration determined by the donor-CU 210 may be DU: {IAB 11, IAB12}; both IAB 11 and IAB12 can be the next node (for example, the next node in a routing sequence) to reach MT1 110-1 (from DU 220). In other words, donor-CU 210 configures donor-DU 220 to select from an option of either (or both) IAB11 and IAB12. Similarly, donor-CU 210 may configure IAB 11 230-11: {IAB21, IAB22}; both IAB21 230-21 and IAB22 230-22 can be (selected as) the next node to reach MT1 110-1. IAB21: {IAB32}; IAB32 can be the next node to reach MT1. IAB22: {IAB32}; IAB32 can be the next node to reach MT1.

For branching node (for example, DU 220 and IAB11 230-11), the configuration may also include a preference. For example, for donor-DU 220, the configuration may indicate that IAB11 230-11 is preferred than IAB12 230-12. Alternatively, this preference may be set per every DL packet. In that case, the preference may be included in the adaptation header of every DL packet.

A further implementation may include both a preference indicated in the initial configuration and an updated preference set per every DL packet. For example, when the adaptation header of the DL packet does not include a preference, the configured preference may be used. When the adaptation header of the DL packet includes a preference, the received preference may be used, instead of the configured preference. The preference information may also include circumstances when a branching node should switch to the less preferred route/branch or start duplicating packets and send them on both branches. The configuration may also include the UE's 110 context, for example, quality of service (QoS) for each dedicated radio bearer (DRB) and/or QoS flow. The preference information may also include circumstances when the link event notification needs to be sent to upstream or downstream nodes (for example, throughput drop, number of HARQ or ARQ retransmissions, signal strength, etc.).

At step 420, donor-CU 210, in some example embodiments, sends the DL data to donor-DU 220 for MT1 110-1. Donor-DU 220 may decide to send the DL data to IAB11 230-11, which is then sent to MT1 110-1 via IAB21 230-21→IAB32 230-32→MT1 110-1. The donor-CU/DU may also include additional information in the adaptation header. For example, the donor-CU/DU may indicate IAB21 230-21 is preferred then IAB22 230-22. This information may be used by the branching node (for example, IAB11 230-11) to determine the next node to reach MT1 110-1.

At step 425, IAB21 may detect a radio link outage between IAB21 and IAB32. In this instance, since IAB21 does not have any other node that can be used to reach MT1, IAB21 informs its upstreaming IAB 230, for example, IAB11 230-11, about the link event. For example, IAB21 230-21 cannot be used for MT1 110-1.

At step 430, donor-CU 210 may send DL data to donor-DU 220. Donor-DU 220 may then send the DL data to IAB11 230-11. Based on the previously received configuration and the link event, IAB11 230-11 may select a different route, for example, via IAB22, for MT1 110-1. DL data may be sent to MT1 110-1 via IAB11 230-11—IAB22 230-22—IAB32 230-32—MT1 110-1. In this case, IAB 11 may have at least one alternative route to MTs 110, so IAB11 230-11 may not forward the link event notification to its upstream nodes.

At step 435, for example at a later time, IAB22 230-22 may also detect a radio link outage between IAB22 230-22 and IAB32 230-32. In this instance, since IAB22 230-22 does not have any other node that can be used to reach MT1 110-1, IAB22 230-22 may inform its upstreaming IAB 230 (for example, IAB11 230-11) about the link event. For example, (the upstreaming IAB 230 may be informed that) IAB22 230-22 cannot be used for MT1 110-1.

At step 440, IAB11 230-11 may determine (for example, know) that both nodes have problems (for example, are currently incapable of routing data). Since IAB11 230-11 does not have any other node that can be used to reach MT1 110-1, IAB 11 230-11 may inform its upstream node, for example, donor-DU 220, in this example. Donor-DU may (then) know that IAB11 230-11 cannot be used to reach MT1 110-1. Based on the configuration received in step 415 and link event, donor-DU 220 may know (for example, determine based on the configuration) that IAB12 230-12 can be used to reach MT 110.

At step 445, donor-CU 210 may send DL data to donor-DU 220. Donor-DU 220 may select a different route, for example, via IAB12 230-12, for MT1 110. DL data may be sent to MT1 110-1 (for example, via IAB12 230-12-MT1 110-1).

At step 450, for example at a later time, IAB22 230-22 may detect the radio link to IAB32 230-22 has resumed. IAB22 230-22 may inform its upstreaming IAB node 230, for example, IAB11 230-11, that IAB22 230-22 can be used for MT1 110-1.

At step 455, since IAB11 230-11 does not have any active route for MT1 110-1, IAB11 230-11 may inform its upstreaming node, for example, donor-DU, that IAB11 230-11 may be used for MT1 110-1. Since IAB11 230-11 is preferred based on previous configuration received in step 415, donor-DU 220 may use IAB 11 230-11 for further DL data delivery to MT1 110.

Donor-CU 210 may send DL data to donor-DU 220. Donor-DU 220 may send the DL data to MT1 110-1 via the route of, IAB11 230-11—IAB22 230-22—IAB32 230-32—MT1 110-1.

The link event notification used in steps 425/435/450 may have the following characteristics. The link event notification may indicate to upstream IAB nodes 230 that an outage has occurred or of a poor quality of a radio link, or that the node 230 has recovered from the outage, that a change of the link quality of a radio link with downstream IAB nodes 230, or that an access MT 110 has been detected. The link event notification may also be related to the upstream node. This may be used by a downstream IAB node 230 to select an upstream IAB node 230 in case of UL radio link issue or recovery with current upstream IAB node 230 (not shown in the call flow of FIG. 4). The detection may be based on the pre-configured or pre-specified conditions mentioned above (for example, throughput drop, number of HARQ or ARQ retransmissions, signal strength, etc.). The IAB node implementation may determine how/when the link event notification is detected, based on the configuration received from donor-CU.

The notification may be delivered in the following way: Within the adaptation layer header of the F1-U (or data) packet of the JAB MT sent to donor-CU 210. In instances in which the link event notification is placed on adaptation layer, not only donor-CU 210, but all the intermediate nodes may read and interpret this information as well and act upon the information included in the link event notification immediately.

Alternatively, the notification may be delivered within RRC message between IAB MT and Donor-CU. In this case, the information may not be interpreted by the intermediate nodes and would traverse them transparently. In these instances, the intermediate nodes just relay the message and do not examine the content of the message. Upon receiving link event notification from a certain IAB MTs, donor-CU 210 would be required to propagate this information to all affected IAB nodes either via RRC signalling to IAB MTs or via F1-AP signalling to IAB DUs.

Providing the notification in the adaptation layer header may result in less signalling delay and overhead. FIG. 4 illustrates messaging within the adaptation layer header.

Figure 5:
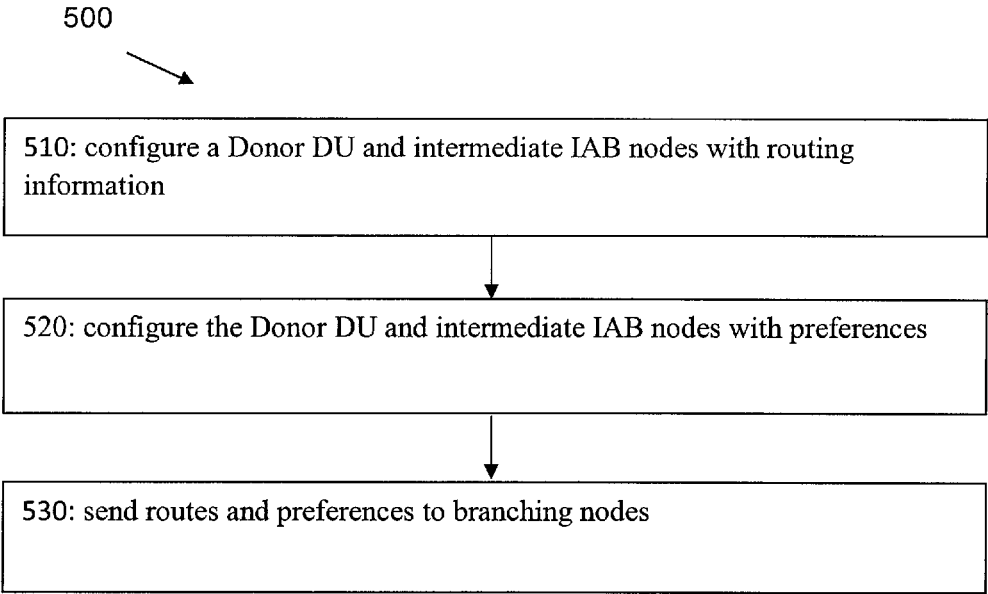
FIG. 5 shows a method in accordance with example embodiments which may be performed by an apparatus.

FIG. 5 is an example flow diagram 500 illustrating a method in accordance with example embodiments which may be performed by an apparatus.

At block 510, a donor-CU 210 device (for example, an apparatus, module or component) may configure a donor-DU 220 device and IAB nodes 230 with routing information. In some instances, the donor-CU 210 device may configure the devices directly with the routing information. Alternatively, donor-CU 210 device may configure with topology information from which routing information can be derived for the next node to reach MT 110 and the donor.

At block 520, donor-CU 210 device may configure donor-DU 220 device and IAB nodes 230 with preferences. Preference information may indicate a preferred route (for example, via route ID or via the identifier of the next hop/next IAB node), and may additionally indicate circumstances when a branching point should switch to the less preferred route/branch or start duplicating packets and send them on both branches. The preference information may also include circumstances when the link event notification needs to be sent to upstream or downstream nodes (for example, when throughput is below or above a threshold, or when number of HARQ or ARQ retransmissions exceed or less than a threshold, or when signal strength is below or above a threshold, etc.).

When configuring preferences, donor-CU 220 may take into account the overall knowledge of the IAB topology as well as characteristics of the particular bearer, QoS flow or knowledge of the MTs 110 service or utilized network slice information. Network slices are defined in TS23.501. Network slices are used to allocated resources in the network according to: 1—A Slice/Service type (SST), which refers to the expected network Slice behavior in terms of features and services; and 2 A Slice Differentiator (SD), which is optional information that complements the Slice/Service type(s) to differentiate amongst multiple Network Slices of the same Slice/Service type. The SST may differentiate between, for example, ultra-low latency from mobile broadband from Internet of Things (IoT). The SD may example separate service between two customers (for example, between Citibank and Wells Fargo™).

At block 530, donor-CU 220 may send the routes and preferences to branching nodes. The donor-CU 220 may send the information via C-plane signalling using RRC or F1AP, or U-plane signalling by adding the preference information in the adaptation header, or both. Donor-CU 220 may also send the routes and preference information to all related IAB nodes via C-plane signalling using RRC or F1AP, or U-plane signalling by adding the preference information in the adaptation header, or both.

FIG. 6 is an example flow diagram 600 illustrating a method in accordance with example embodiments which may be performed by an apparatus.

At block 610, branching IAB node 230 or donor-DU 220 may receive the routes and preference information from donor-CU 210. The branching JAB node 230 or donor-DU 220 may receive the routes and preference information from the CU 210 via C-plane or U-plane. The other IAB node 230 may also receive the preference information from the CU 210 via C-plane or U-plane.

At block 620, the IAB node 230 or donor-DU 220 may generate link event notifications based on the configured preference information received from the donor-CU 210. In case the donor-CU 210 does not provide the preference information regarding when the link event should be generated, the IAB node 230 may generate link event notification based on its implementation. The IAB node 230 or donor-DU 220 may transmit the link event notification to a downstream node, or a upstream node. The link event notification may be propagated by the intermediate IAB node until it reaches a branching node (for example, an IAB node 230, or a donor-DU 220).

At block 630, branching node (for example, IAB node 230 or donor-DU 220) may receive the link event notification from the downstream and/or upstream IAB nodes 230 or donor. A link event notification may occur under several circumstances, which may be configurable or pre-specified, for example, when the throughput characteristics of a link changes significantly, when number of HARQ retransmissions on a link reaches a certain number, when number of RLC ARQ retransmissions reaches a certain number, etc.

At block 640, branching IAB node 230 or donor-DU 220 may adapt the uplink and/or downlink routes based on the route preference and the link event notifications.

At block 650, the IAB node 230 or donor-DU 220 may propagate the link event notification to all next-hop routes.

Without in any way limiting the scope, interpretation, or application of the claims appearing below, a technical effect of one or more of the example embodiments disclosed herein is that routes can be adapted to the current radio conditions much quicker than with RRC signalling. In some instances, for example, sudden blockage of the radio path may result in very poor radio conditions. In these instances, the usage of RRC signalling may not be possible (or advisable) due to a high likelihood that the required RRC messages would not be delivered to the target node (for example, measurement report from MT 110 to donor-CU 210). Another technical effect is that less signalling is required. For example, donor-CU may be unaware of the route selection, but CU still have the control by providing configuration of preference information. The example embodiments may be applied to either access UEs or MT part of the IAB node (in both cases, UE/MT is connected to two separate upstream IAB nodes using Dual-Connectivity).

An example embodiment may provide a method comprising configuring, by at least one donor central unit, at least one of at least one donor distributed unit and at least one integrated access and backhaul node with routing information to reach at least one mobile terminal and the at least one donor; configuring the at least one of the at least one donor distributed unit and the at least one integrated access and backhaul node with preference information; and sending the routing information and the preference information to at least one branching node and the at least one integrated access and backhaul node.

In accordance with the example embodiments as described in the paragraphs above, wherein configuring the at least one of at least one donor distributed unit and the at least one integrated access and backhaul node with routing information further comprises at least one of: configuring the at least one of at least one donor distributed unit and the at least one integrated access and backhaul node directly with routing information; and configuring the at least one of at least one donor distributed unit and the at least one integrated access and backhaul node with topology information from which the routing information is derivable.

In accordance with the example embodiments as described in the paragraphs above, wherein sending the routing information and the preference information further comprises: sending the routing information and the preferences via at least one of: C-plane signalling using at least one of radio resource control and front haul application protocol, and U-plane signalling by adding the preference information in at least one adaptation header.

In accordance with the example embodiments as described in the paragraphs above, wherein the preference information indicates a preferred route via at least one of route identifier and an identifier of a next hop.

In accordance with the example embodiments as described in the paragraphs above, wherein the preference information further indicates at least one of a circumstance at which a branching point is to switch to a less preferred route, a circumstance at which the branching point is to start duplicating packets and sending the duplicated packets on each of at least two branches at the branching point, and a circumstance at which an integrated access and backhaul node send a link event notification.

In accordance with the example embodiments as described in the paragraphs above, wherein configuring the at least one of at least one donor distributed unit and the at least one integrated access and backhaul node with the preference information further comprises: configuring the at least one of at least one donor distributed unit and the at least one integrated access and backhaul node based on at least one of an overall knowledge of an integrated access and backhaul node topology; at least one characteristic of at least one particular bearer; at least one quality of service flow; and utilized network slice information.

An example embodiment may provide a method comprising receiving, by at least one integrated access and backhaul node and donor distributed unit, routing information and preference information to reach at least one mobile terminal and the at least one donor in an integrated access and backhaul node topology and at least one of: transmitting at least one link event notification; receiving at least one link event notification; and adapting at least one of an uplink route and a downlink route based on the preference information and the at least one link event notification.

In accordance with the example embodiments as described in the paragraphs above, wherein the preference information indicates a preferred route via at least one of route identifier and an identifier of a next hop.

In accordance with the example embodiments as described in the paragraphs above, wherein the received preference information further indicates at least one of a circumstance at which a branching point is to switch to a less preferred route, a circumstance at which the branching point is to start duplicating packets and sending the duplicated packets on each of at least two branches at the branching point, and a circumstance at which an integrated access and backhaul node send a link event notification.

In accordance with the example embodiments as described in the paragraphs above, wherein transmitting the at least one link event notification when at least one of: throughput characteristics of a link changes significantly; a number of hybrid automatic repeat request retransmissions on a link reaches a particular number; a number of radio link control automatic repeat request retransmissions reaches a particular number, and the radio link availability or route availability is changed.

In accordance with the example embodiments as described in the paragraphs above, wherein transmitting the at least one link event notification further comprises: transmitting the at least one link event notification to at least one of at least one downstream integrated access and backhaul node, at least one upstream integrated access and backhaul node, and a donor.

In accordance with the example embodiments as described in the paragraphs above, wherein receiving the at least one link event notification further comprises: receiving the at least one link event notification from at least one of at least one downstream integrated access and backhaul node, at least one upstream integrated access and backhaul node, and donor.

In accordance with the example embodiments as described in the paragraphs above, wherein at least one link event notification further comprises at least one of: a binary indication of a radio link availability, or a route availability, or a link is resumed after declaring no route available; and several levels indicating radio link quality.

An example embodiment may provide an apparatus comprising means for configuring, by at least one donor central unit, at least one of at least one donor distributed unit and at least one integrated access and backhaul node with routing information to reach at least one mobile terminal and the at least one donor; means for configuring the at least one of at least one donor distributed unit and the at least one intermediate integrated access and backhaul node with preference information; and means for sending the routing information and the preference information to at least one branching node and the at least one integrated access and backhaul node.

In accordance with the example embodiments as described in the paragraphs above, wherein the means for configuring the at least one of at least one donor distributed unit and the at least one intermediate integrated access and backhaul node with routing information further comprises at least one of: means for configuring the at least one of at least one donor distributed unit and the at least one integrated access and backhaul node directly with routing information; and means for configuring the at least one of at least one donor distributed unit and the at least one integrated access and backhaul node with topology information from which the routing information is derivable.

In accordance with the example embodiments as described in the paragraphs above, wherein the means for sending the routing information and the preference information further comprises: means for sending the routing information and the preferences via at least one of: C-plane signalling using at least one of radio resource control and front haul application protocol, and U-plane signalling by adding the preference information in at least one adaptation header.

In accordance with the example embodiments as described in the paragraphs above, wherein the preference information indicates a preferred route via at least one of route identifier and an identifier of a next hop.

In accordance with the example embodiments as described in the paragraphs above, wherein the preference information further indicates at least one of a circumstance at which a branching point is to switch to a less preferred route, a circumstance at which the branching point is to start duplicating packets and sending the duplicated packets on each of at least two branches at the branching point, and a circumstance at which an integrated access and backhaul node send a link event notification.

An example embodiment may provide an apparatus comprising means for receiving, by at least one branching node, routing information and preference information to reach at least one mobile terminal and the at least one donor in an integrated access and backhaul node topology; means for generating at least one link event notification; means for receiving at least one link event notification; and means for adapting at least one of an uplink route and a downlink route based on the route preference and the at least one link event notification.

In accordance with the example embodiments as described in the paragraphs above, wherein the means for receiving the at least one link event notification further comprises: means for receiving the at least one link event notification from at least one of at least one downstream integrated access and backhaul node, at least one upstream integrated access and backhaul node, and a donor.

An example embodiment may be provided in an apparatus comprising at least one processor; and at least one non-transitory memory including computer program code, the at least one memory and the computer program code may be configured to, with the at least one processor, cause the apparatus to: configure, by at least one donor central unit, at least one of at least one donor distributed unit and at least one integrated access and backhaul node with routing information to reach at least one mobile terminal and the at least one donor; configure the at least one of the at least one donor distributed unit and the at least one integrated access and backhaul node with preference information; and send the routing information and the preference information to at least one branching node and the at least one integrated access and backhaul node.

In accordance with the example embodiments as described in the paragraphs above, wherein, when configuring the at least one of at least one donor distributed unit and the at least one integrated access and backhaul node with routing information, the at least one memory and the computer program code may be further configured to, with the at least one processor, cause the apparatus to at least one of: configure the at least one of at least one donor distributed unit and the at least one integrated access and backhaul node directly with routing information; and configure the at least one of at least one donor distributed unit and the at least one integrated access and backhaul node with topology information from which the routing information is derivable.

In accordance with the example embodiments as described in the paragraphs above, wherein, when sending the routing information and the preference information, the at least one memory and the computer program code may be further configured to, with the at least one processor, cause the apparatus to send the routing information and the preferences via at least one of: C-plane signalling using at least one of radio resource control and front haul application protocol, and U-plane signalling by adding the preference information in at least one adaptation header.

In accordance with the example embodiments as described in the paragraphs above, wherein the preference information indicates a preferred route via at least one of route identifier and an identifier of a next hop.

In accordance with the example embodiments as described in the paragraphs above, wherein the preference information further indicates at least one of a circumstance at which a branching point is to switch to a less preferred route, a circumstance at which the branching point is to start duplicating packets and sending the duplicated packets on each of at least two branches at the branching point, and a circumstance at which an integrated access and backhaul node send a link event notification.

In accordance with the example embodiments as described in the paragraphs above, wherein, when configuring the at least one of at least one donor distributed unit and the at least one integrated access and backhaul node with the preference information, the at least one memory and the computer program code may be further configured to, with the at least one processor, cause the apparatus to configure the at least one of at least one donor distributed unit and the at least one integrated access and backhaul node based on at least one of an overall knowledge of an integrated access and backhaul node topology; at least one characteristic of at least one particular bearer; at least one quality of service flow; and utilized network slice information.

An example embodiment may be provided in an apparatus comprising at least one processor; and at least one non-transitory memory including computer program code, the at least one memory and the computer program code may be configured to, with the at least one processor, cause the apparatus to: receive, by at least one integrated access and backhaul node and donor distributed unit, route information and preference information to reach at least one mobile terminal and the at least one donor in an integrated access and backhaul node topology; transmit at least one link event notification; receive at least one link event notification; and adapt at least one of an uplink route and a downlink route based on the preference information and the at least one link event notification.

In accordance with the example embodiments as described in the paragraphs above, wherein the preference information indicates a preferred route via at least one of route identifier and an identifier of a next hop.

In accordance with the example embodiments as described in the paragraphs above, wherein the received preference information further indicates at least one of: a circumstance at which a branching point is to switch to a less preferred route, a circumstance at which the branching point is to start duplicating packets and sending the duplicated packets on each of at least two branches at the branching point, and a circumstance at which an integrated access and backhaul node send a link event notification.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising
at least one processor; and
at least one memory storing instructions that, when executed with the at least one processor, cause the apparatus at least to:
   receive routing information to reach at least one of at least one mobile terminal, or at least one donor distributed unit, in an integrated access and backhaul node topology;
   receive preference information indicating at least an adaptable preferred route to reach the at least one of the at least one mobile terminal, or the at least one donor distributed unit, in the integrated access and backhaul node topology, wherein the preference information comprises at least a route identifier identifying the adaptable preferred route within the routing information, wherein the adaptable preferred route comprises a route preferred by a donor central unit, wherein the adaptable preferred route comprises a route for transmission of downlink traffic for at least one integrated access and backhaul node;
   transmit and/or receive at least one link event notification; and
   adapt the adaptable preferred route based on the preference information, the routing information and the at least one link event notification.

2. The apparatus according to claim 1, wherein the apparatus comprises, or is comprised in, another integrated access and backhaul node or the at least one donor distributed unit.

3. The apparatus according to claim 1, wherein the at least one link event notification is transmitted and/or received via an adaptation layer header, wherein the at least one link event notification is transmitted and/or received in response to at least one of:
   throughput characteristics of a link changing significantly,
   a number of hybrid automatic repeat request retransmissions on a link reaching a first number,
   a number of radio link control automatic repeat request retransmissions reaching a second number, or
   a radio link availability or route availability is changed.

4. The apparatus according to claim 1, wherein transmitting the at least one link event notification comprises the instructions, when executed with the at least one processor, cause the apparatus to:
   transmit the at least one link event notification to at least one of
      at least one downstream integrated access and backhaul node,
      at least one upstream integrated access and backhaul node, or
      the at least one donor distributed unit; and/or wherein receiving the at least one link event notification comprises the instructions, when executed with the at least one processor, cause the apparatus to:

receive the at least one link event notification from at least one of the at least one downstream integrated access and backhaul node, the at least one upstream integrated access and backhaul node, or the at least one donor distributed unit.

5. The apparatus according to claim 1, wherein the at least one link event notification is associated with at least part of the adaptable preferred route, wherein the at least one link event notification comprises an indication of at least one of:

a binary indication of a radio link availability, or a route availability, or a link is resumed after declaring no route available; or several levels indicating radio link quality.

6. The apparatus according to claim 1, wherein the routing information is comprised in at least one front haul application protocol signaling message and the preference information is comprised in an adaptation header of a downlink data packet.

7. The apparatus according to claim 1, wherein receiving the routing information and the preference information comprises the instructions, when executed with the at least one processor, cause the apparatus to:

receive the routing information via C-plane signalling using at least one of radio resource control or front haul application protocol; and/or receive the preference information via U-plane signalling, wherein at least one adaptation header comprises the preference information.

8. The apparatus according to claim 1, wherein the instructions, when executed with the at least one processor, cause the apparatus to:

propagate the at least one link event notification to at least one next-hop route.

9. A method comprising:

receiving routing information to reach at least one of at least one mobile terminal, or at least one donor distributed unit, in an integrated access and backhaul node topology;

receiving preference information indicating at least an adaptable preferred route to reach the at least one of the at least one mobile terminal, or the at least one donor distributed unit, in the integrated access and backhaul node topology, wherein the preference information comprises at least a route identifier identifying the adaptable preferred route within the routing information, wherein the adaptable preferred route comprises a route preferred by a donor central unit, wherein the adaptable preferred route comprises a route for transmission of downlink traffic for at least one integrated access and backhaul node;

transmitting and/or receiving at least one link event notification; and adapting the adaptable preferred route based on the preference information, the routing information and the at least one link event notification.

10. The method according to claim 9, wherein the at least one link event notification is transmitted and/or received in response to at least one of:

throughput characteristics of a link changing significantly, a number of hybrid automatic repeat request retransmissions on a link reaching a first number, a number of radio link control automatic repeat request retransmissions reaching a second number, or a radio link availability or route availability is changed.

11. The method according to claim 9, wherein transmitting the at least one link event notification comprises transmitting the at least one link event notification to at least one of at least one downstream integrated access and backhaul node, at least one upstream integrated access and backhaul node, or the at least one donor distributed unit; and/or wherein receiving the at least one link event notification comprises receiving the at least one link event notification from at least one of the at least one downstream integrated access and backhaul node, the at least one upstream integrated access and backhaul node, or the at least one donor distributed unit.

12. The method according to claim 9, wherein the at least one link event notification comprises an indication of at least one of:

a binary indication of a radio link availability, or a route availability, or a link is resumed after declaring no route available; or several levels indicating radio link quality.

13. The method according to claim 9, wherein the routing information is comprised in at least one front haul application protocol signaling message and the preference information is comprised in an adaptation header of a downlink data packet.

14. The method according to claim 9, wherein the receiving of the routing information and the preference information comprises:

receiving the routing information via C-plane signalling using at least one of radio resource control or front haul application protocol; and/or receiving the preference information via U-plane signalling, wherein at least one adaptation header comprises the preference information.

15. A non-transitory computer-readable medium comprising instructions stored thereon for performing at least the following:

causing receiving of routing information to reach at least one of at least one mobile terminal, or at least one donor distributed unit, in an integrated access and backhaul node topology;

causing receiving of preference information indicating at least an adaptable preferred route to reach the at least one of the at least one mobile terminal, or the at least one donor distributed unit, in the integrated access and backhaul node topology, wherein the preference information comprises at least a route identifier identifying the adaptable preferred route within the routing information, wherein the adaptable preferred route comprises a route preferred by a donor central unit, wherein the adaptable preferred route comprises a route for transmission of downlink traffic for at least one integrated access and backhaul node;

causing transmitting and/or receiving at least one link event notification; and adapting the adaptable preferred route based on the preference information, the routing information and the at least one link event notification.

16. The non-transitory computer-readable medium of claim 15, wherein the at least one link event notification is caused to be transmitted and/or received in response to at least one of:

throughput characteristics of a link changing significantly, a number of hybrid automatic repeat request retransmissions on a link reaching a first number, a number of radio link control automatic repeat request retransmissions reaching a second number, or a radio link availability or route availability is changed.

17. The non-transitory computer-readable medium of claim 15, wherein causing transmitting of the at least one link event notification comprises causing transmitting of the at least one link event notification to at least one of at least one downstream integrated access and backhaul node, at least one upstream integrated access and backhaul node, or the at least one donor distributed unit; and/or wherein causing receiving of the at least one link event notification comprises causing receiving of the at least one link event notification from at least one of the at least one downstream integrated access and backhaul node, the at least one upstream integrated access and backhaul node, or the at least one donor distributed unit.

18. The non-transitory computer-readable medium of claim 15, wherein the at least one link event notification comprises an indication of at least one of:

a binary indication of a radio link availability, or a route availability, or a link is resumed after declaring no route available; or several levels indicating radio link quality.

19. The non-transitory computer-readable medium of claim 15, wherein the routing information is comprised in at least one front haul application protocol signaling message and the preference information is comprised in an adaptation header of a downlink data packet.

* * * * *